US012436035B2

(12) United States Patent
Tremblay

(10) Patent No.: US 12,436,035 B2
(45) Date of Patent: Oct. 7, 2025

(54) SYSTEM AND METHOD FOR DETERMINING A MODAL PROPERTY OF A QUANTUM STATE USING TWO-TIME CORRELATION MEASUREMENTS

(71) Applicant: XANADU QUANTUM TECHNOLOGIES INC., Toronto (CA)

(72) Inventor: Jean-Etienne Tremblay, Toronto (CA)

(73) Assignee: XANADU QUANTUM TECHNOLOGIES INC., Toronto (CA)

( * ) Notice: Subject to any disclaimer, the term of this patent is extended or adjusted under 35 U.S.C. 154(b) by 268 days.

(21) Appl. No.: 17/994,054

(22) Filed: Nov. 25, 2022

(65) Prior Publication Data

US 2024/0175760 A1 May 30, 2024

(51) Int. Cl.
*G01J 9/02* (2006.01)

(52) U.S. Cl.
CPC .................. *G01J 9/02* (2013.01)

(58) Field of Classification Search
CPC .......... G01J 9/02; G01J 9/04; G01J 11/00
See application file for complete search history.

(56) References Cited

U.S. PATENT DOCUMENTS

| 4,765,735 A * | 8/1988 | Mori ............... H01S 5/0014 356/121 |
| 11,126,062 B1 * | 9/2021 | Kieling ............ G02F 1/365 |
| 12,141,658 B2 * | 11/2024 | Litinski ............ G06N 10/40 |
| 2024/0243816 A1 * | 7/2024 | Bacco ............... H04B 10/70 |

OTHER PUBLICATIONS

McAlister, D. F., and M. G. Raymer. "Ultrafast Photon-Number Correlations from Dual-Pulse, Phase-Averaged Homodyne Detection." Physical Review A 55, No. 3 (Mar. 1, 1997): R1609-12. https://doi.org/10.1103/PhysRevA.55.R1609.
Opatrny, T., D.-G. Welsch, and W. Vogel. "Homodyne Detection for Measuring Internal Quantum Correlations of Optical Pulses." Physical Review A 55, No. 2 (Feb. 1, 1997): 1416-22. https://doi.org/10.1103/PhysRevA.55.1416.
Qin, Zhongzhong, Adarsh S. Prasad, Travis Brannan, Andrew MacRae, A. Lezama, and A. I. Lvovsky. "Complete Temporal Characterization of a Single Photon." Light: Science & Applications 4, No. 6 (Jun. 2015): e298-e298. https://doi.org/10.1038/lsa.2015.71.

(Continued)

*Primary Examiner* — Jonathan M Hansen
(74) *Attorney, Agent, or Firm* — Norton Rose Fulbright Canada LLP; Reno Lessard

(57) ABSTRACT

There is described a system for determining a modal property of a quantum state. The system generally has a quantum light source generating an optical pulse having a given frequency, a pulse time duration and a quantum state with a modal property; a local pulse generator having: a laser source generating a local optical signal having a frequency associated to the given frequency; an optical modulator modulating the local optical signal; and an arbitrary wave generator supplying electrical waveforms to the optical modulator for said modulating, said modulating including forming local optical pulses from the local optical signal, the local optical pulses being distributed within the pulse time duration; and a homodyne detector optically coupled to the quantum light source and to the local pulse generator for performing two-time correlation measurements being indicative of the modal property of the quantum state of the given optical pulse.

20 Claims, 6 Drawing Sheets

(56) References Cited

OTHER PUBLICATIONS

Fabre, Claude, and Nicolas Treps. "Modes and States in Quantum Optics." Reviews of Modern Physics 92, No. 3 (Sep. 10, 2020): 035005. https://doi.org/10.1103/RevModPhys.92.035005.

* cited by examiner

SYSTEM AND METHOD FOR DETERMINING A MODAL PROPERTY OF A QUANTUM STATE USING TWO-TIME CORRELATION MEASUREMENTS

FIELD

The improvements relate to quantum optics and more particularly to systems and methods used to measure modal properties of quantum states of optical pulses of interest.

BACKGROUND

In quantum optics, a quantum state is a mathematical entity providing a probability distribution for the outcomes of each possible measurement on an optical system. Different types of quantum states of light exist including, but not limited to, single-photon states, thermal states, squeezed states, coherent states, vacuum states, to name a few examples. All these quantum states can carry different modal properties. Measuring modal properties of a quantum state carried by an optical pulse can be useful in a number of applications such as in controlling quality of quantum light sources, for instance. It has been shown that a quantum state's modal properties, e.g., number of modes, temporal shapes of the modes, and the like, can be accurately measured by performing two-time correlation measurements of the quantum state. These measurements generally involve the mixing of an optical pulse of interest with two or more spaced-apart local optical pulses which sample the optical pulse of interest in two or more separate time windows. By performing a statistically relevant number of two-time correlation measurements using the same time windows, and then other measurement rounds with different time windows, correlation matrices are obtained. These correlation matrices, and more specifically their eigenvalues and eigenmodes, can be informative on the modal properties of the quantum state carried by the optical pulse of interest thereby allowing its quantum state reconstruction. Although existing systems for performing two-time correlation measurements on quantum light sources have been satisfactory to a certain degree, there remains room for improvement.

SUMMARY

Existing systems for performing two-time correlation measurements generally use a pulsed laser source optically coupled to an interferometer to generate the local optical pulses used to probe the optical pulse of interest. As satisfactory as these systems can be, it was found that the time delays which can be introduced between the local optical pulses are limited by the interferometer arms' physical length variations, thereby limiting the range of two-time correlation measurements that these systems can make. For instance, it is not uncommon for quantum states to last a few nanoseconds, which would typically require the length of the interferometer to change by at least 30 cm.

In this disclosure, there is described an exemplary system for determining one or more modal properties of a quantum state of an optical pulse allowing broader two-time correlation measurement ranges. As described further below, the system is based on a pulsed homodyne tomography. The system can have a quantum light source which generates a given optical pulse having a quantum state, a given frequency and a given pulse time duration. The system also has a local pulse train generator with a laser source, an optical modulator and an arbitrary wave generator. The laser source is used to generate a local optical signal which has a local frequency associated to the given frequency of the given optical pulse. The optical modulator is optically coupled to the laser source and is used to modulate the local optical signal to form a train of local optical pulses. More specifically, with the arbitrary wave generator being electrically coupled to the optical modulator, electrical waveforms supplied by the arbitrary wave generator to the optical modulator can effectively control the modulation of the local optical signal. The electrical waveforms are such that the modulated local optical signal forms a train of local optical pulses which spans within the given pulse time duration of the given optical pulse. The system is also provided with a homodyne detector which is optically coupled to the quantum light source and to the local pulse train generator. The homodyne detector is configured for performing two-time correlation measurements between the given optical pulse and the train of local optical pulses in a way that the two-time correlation measurements are indicative of the modal property(ies) of the quantum state of the given optical pulse.

In accordance with a first embodiment of the present disclosure, there is provided a system for determining a modal property of a quantum state using two-time correlation measurements, the system comprising: a quantum light source generating a given optical pulse having a given frequency, a given pulse time duration and a quantum state, the quantum state having a modal property; a local pulse train generator having: a laser source generating a local optical signal having a local frequency associated to the given frequency; an optical modulator optically coupled to the laser source and modulating the local optical signal; and an arbitrary wave generator electrically coupled to the optical modulator and supplying electrical waveforms to the optical modulator for said modulating, said modulating including forming a train of local optical pulses from the local optical signal, the train of local optical pulses being distributed within the given pulse time duration; and a homodyne detector optically coupled to the quantum light source and to the local pulse train generator, the homodyne detector performing two-time correlation measurements between the given optical pulse and the train of local optical pulses, the two-time correlation measurements being indicative of the modal property of the quantum state of the given optical pulse.

In accordance with a second embodiment of the present disclosure, there is provided a method of determining a modal property of a quantum state using two-time correlation measurements, the method comprising: generating a given optical pulse having a quantum state, a given frequency and a given pulse time duration; using an arbitrary wave generator, supplying electrical waveforms to an optical modulator for modulating a local optical signal having a local frequency associated to the given frequency, said modulating including forming a train of local optical pulses from the local optical signal, the train of local optical pulses being distributed within the given pulse time duration; and using a homodyne detector, mixing the given optical pulse and the train of local optical pulses to one another and performing two-time correlation measurements based on said mixing, the two-time correlation measurements being indicative of the modal property of the quantum state of the given optical pulse.

It will be understood that the expression "computer" as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

It will be understood that a computer can perform functions or processes via hardware or a combination of both hardware and software. For example, hardware can include logic gates included as part of a silicon chip of a processor. Software (e.g., application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. A processor, controller, and/or memory can be local in some embodiments, or partially or entirely remote, distributed and/or virtual in other embodiments.

Many further features and combinations thereof concerning the present improvements will appear to those skilled in the art following a reading of the instant disclosure.

DESCRIPTION OF THE FIGURES

In the figures,

FIG. 1A is a graph showing pulse shapes of an exemplary optical pulse of interest and of a train of local optical pulses, in accordance with one or more embodiments;

DETAILED DESCRIPTION

Figure 1:
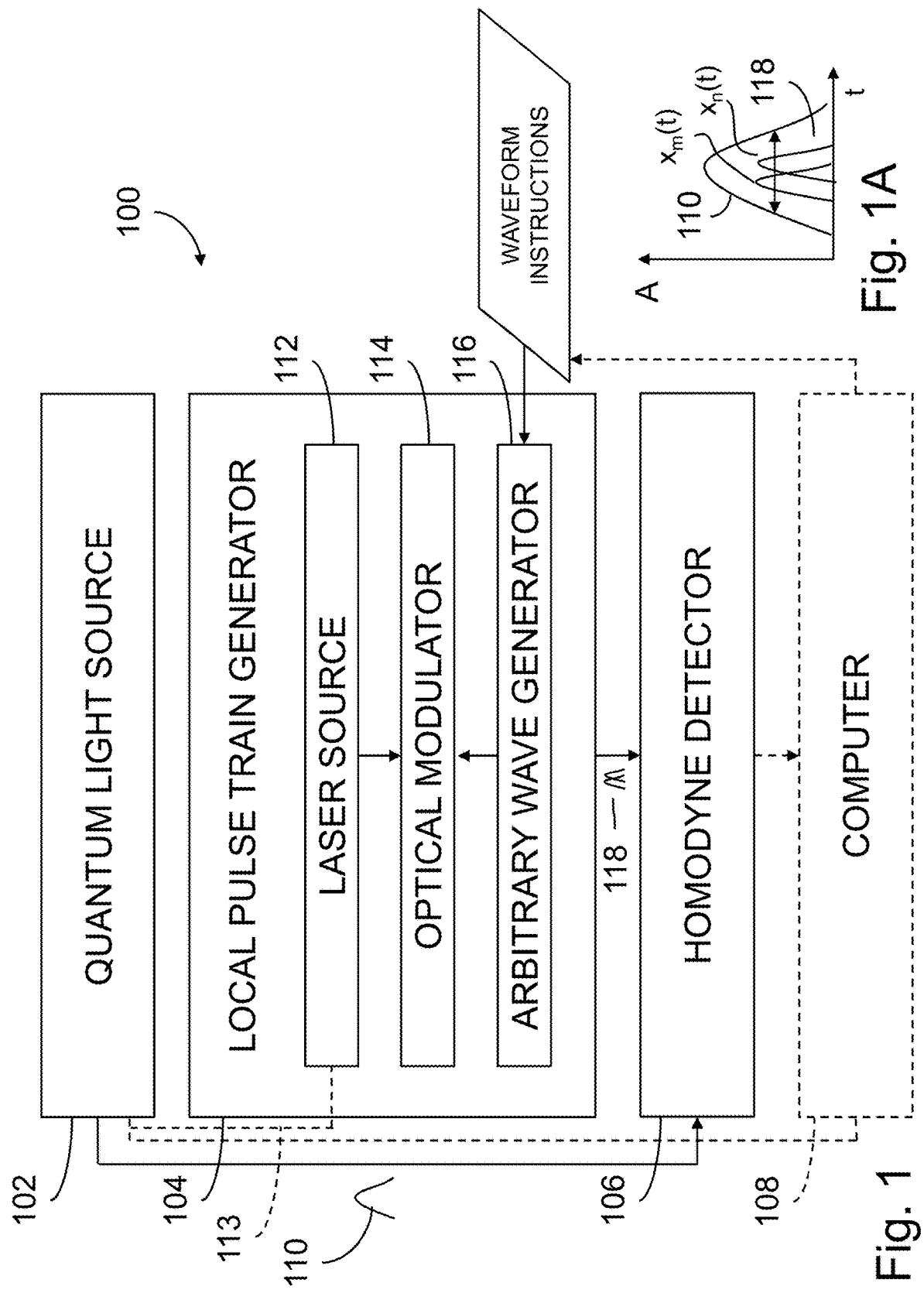
FIG. 1 is a block diagram of an example of a system for determining a modal property of a quantum state, including a quantum light source, a local pulse train generator, a homodyne detector and a computer, in accordance with one or more embodiments.

FIG. 1 shows an example of a system 100 for determining a modal property of a quantum state using two-time correlation measurements. As depicted, the system 100 has a quantum light source 102, a local pulse train generator 104 and a homodyne detector 106. In some embodiments, a computer 108 is communicatively coupled to the quantum light source 102, the local pulse train generator 104 and/or to the homodyne detector 106.

The quantum light source 102 is pulsed so it is configured for generating an optical pulse 110 of interest. The optical pulse 110 has a given frequency and a given pulse time duration. The given frequency of the optical pulse 110 can equivalently be referred to as a given wavelength, for instance. Typically, the optical pulse 110 carries optical power across a relatively broad frequency range. Accordingly, the given frequency can be a central frequency and/or an average frequency of the optical pulse's frequency range or spectrum. The given pulse time duration of the optical pulse 110 can be expressed in terms of its full width at half maximum (FWHM) or any other suitable metric, including or excluding any side lobes that the optical pulse 110 of interest may have. The optical pulse 110 also has a quantum state which generally carries one or more modal properties including, but not limited to, a number of modes, temporal shapes for these modes, and the like. Typically, the temporal shapes of a quantum state are a few nanoseconds long up to 10 nanoseconds, for instance. The quantum state of the optical pulse 110 can be a single-photon state, a squeezed state, and the like. Accordingly, modal properties of a squeezed state or a single-photon state can be measured using the system 100. It is noted that the system 100 is configured for determining the modal property(ies) of the quantum state of the optical pulse 110 with no or only limited prior knowledge concerning the optical pulse 110. For instance, prior knowledge may include the given frequency of the optical pulse 110, the given pulse time duration of the optical pulse 110, assumptions as to the number of modes or their temporal shapes, and the like.

As shown, the local pulse train generator 104 has a laser source 112 which is configured for generating a local optical signal. In some embodiments, the laser source 112 is a continuous wave (CW) laser source and the local optical signal is a CW laser beam. The local optical signal has a local frequency associated to the given frequency of the optical pulse 110. As such, the local frequency generally can correspond, and in some embodiments can be substantially similar, to the given frequency of the optical pulse 110 of interest. For optimal efficiency, the local frequency is equal to an average frequency of the quantum state of the optical pulse 110. In some embodiments, the local frequency of the local optical signal is locked to the given frequency of the optical pulse 110, plus or minus a given offset. In these latter embodiments, the laser source 112 may be optically coupled to the quantum light source 102 such as shown by the dashed line 113. The laser source 112 can be frequency locked, within a given offset, to one or more pulsed pump lasers of the quantum light source 102, for instance. It is noted that, at least during two-time correlation measurements, the local pulse train generator 104 is not phase locked to the quantum state of the optical pulse 110 as the system 100 measures a phase averaged variance of the optical pulse's quantum state to determine its modal property(ies).

As depicted, the local pulse train generator 104 is provided with an optical modulator 114 which is optically coupled to the laser source 112. The optical modulator 114 is configured for modulating the local optical signal in a way which forms a train of local optical pulses 118. The train includes local optical pulses that typically closely follow each other in the time-domain. For instance, the local pulse train generator 104 can produce local optical pulses that are relatively short. As such, local optical pulses as short as 200 ps can be produced. Typically, the pulse time duration of a local optical pulse can range between about 200 ps to about 10 ns, preferably about 225 ps to about 1 ns and most preferably between about 250 ps and 500 ps. The optical modulator 114 modulates the local optical signal based on electrical waveforms that can drive one or more components of the optical modulator 114. For instance, the electrical waveforms can drive an electro-optic element of the optical modulator 114. For instance, the electro-optic element can be a lithium niobate electro-optic element. In these embodiments, the electrical waveforms can deform the electro-optic element in such a way that the optical modulator 114 modulates the local optical signal into the train of local optical pulses. In some embodiments, the optical modulator 114 is provided in the form of an IQ modulator. In some other embodiments, the optical modulator 114 can have one or more electro-optic elements and/or piezoelectric elements which can be collectively or individually driven by the electrical waveforms. In these embodiments, the IQ modulator can split the local optical signal into two optical paths thereby forming first and second signal portions. The electrical waveforms include an in-phase electrical waveform (I) modulating the first signal portion and a quadrature electrical waveform (Q) modulating the second signal portion. Each one of the first and second signal portions can thus be modulated independently using a respective one of the in-phase electrical waveform I and the quadrature electrical waveform Q. The IQ modulator is adapted to add a relative phase difference of 90° between the first and second signal portions. For instance, a 90° phase shift can be added to either one of the first and second signal portions. In some other embodiments, a phase shift of +45° can be added to the first signal portion while a phase shift of −45° can be added to the second signal portion. Other possible phase shift combinations can be used as well in some other embodiments. The modulation performed by the electrical waveforms can be upstream or downstream of the phase shift addition(s), depending on the embodiment. The local optical pulses are obtained downstream of the modulation and of the phase shift addition(s) by recombining the first and second signal portions along a single optical path. In this way, the IQ modulator can provide full modulation of the local optical signal. It is intended that the train of local optical pulses can include two or more local optical pulses. It is noted that the number of local optical pulses in the train, their respective mode basis, respective time delays with respect to one another, their mode numbers and phase shifts can collectively be referred to as a local optical pulse configuration. For instance, in an exemplary local optical pulse configuration, the train may include only two local optical pulses, each formed in the Hermite-Gaussian mode basis, with respective mode numbers 1 and 2, and no phase shift relative to one another. As will be further discussed below, fully determining the modal property of an optical pulse's quantum state can involve a significant number of two-time correlation measurements for each one of a plurality of different local optical pulse configurations.

As best shown in FIG. 1A, it is intended that the local optical pulses 118 of the train are distributed within the given pulse time duration of the optical pulse 110. In other words, the local optical pulses 118 overlap at least partially or wholly with the optical pulse 110. The local optical pulses 118 are typically shaped into preprogrammed modes of an orthogonal mode basis. Examples of such an orthogonal mode basis can include, but are not limited to, the Hermite-Gaussian orthogonal mode basis, the Laguerre-Gaussian orthogonal mode basis and the time-shifted Dirac impulse-type mode basis, to name a few examples. These mode bases can be real and/or complex functions. In some embodiments, the train of local optical pulses can include two or more local optical pulses which are orthogonal to one another. However, it is generally preferred to limit the train of local optical pulses to two local optical pulses, hereinafter referred to as the first and second local optical pulses. In these embodiments, the first local optical pulse generally has a first mode which is orthogonal to a second mode of the second local optical pulse. As shown, in this specific example, the temporal shapes of the first and second local optical pulses can be represented by the functions $x_m(t)$ and $x_n(t)$, respectively, with m and n denoting integers corresponding to their respective mode numbers. For instance, in the illustrated embodiment, a first one of the local optical pulses is a first Dirac impulse mode $x_m(t)$ and a second one of the local optical pulses is a second Dirac impulse mode $x_n(t)$ temporally shifted respective to the first Dirac impulse mode. In some other embodiments, a first local optical pulse can be shaped to correspond to the first Hermite-Gaussian mode whereas a second local optical pulse can be shaped to correspond to the second Hermite-Gaussian mode, and so forth.

Referring back to FIG. 1, the local pulse train generator 104 has an arbitrary wave generator 116 which is electrically coupled to the optical modulator 114. The arbitrary wave generator 116 can be used to form a train of local optical pulses in accordance with any appropriate local optical pulse configurations. More specifically, the electrical waveforms that are used by the optical modulator 114 for the modulation originate from the arbitrary wave generator 116. It is known that the arbitrary wave generator 116 is a piece of electronic test equipment used to generate electrical waveforms. These electrical waveforms can be either repetitive or single-shot (once only) in which case some kind of triggering source is required (internal or external). The arbitrary wave generator 116 can generate any arbitrarily defined electrical waveform as outputs. The electrical waveform is usually defined as a series of "waypoints" (specific voltage targets occurring at specific times along the waveform) and the arbitrary wave generator 116 can either jump to those levels or use any of several methods to interpolate between those levels. As the resulting waveforms are typically injected into a device under test and analyzed as they progress through it, the electrical waveforms are rather used to control the optical modulator 114 in this disclosure, as it was found that the arbitrary wave generator 116 can allow for broader temporal spacing between two subsequent local optical pulses of a same train compared to conventional interferometric systems. Examples of arbitrary wave generators can include, but are not limited to, the Keysight Technologies M8190A data generator, the Tektronix AWG5202-250 arbitrary wave generator, to name a few examples. Preferably, the optical modulator 104 has a bandwidth which is greater than the inverse of a pulse time duration of a shorter one of the desired local optical pulses. The greater bandwidth of the optical modulator 104 allows the formation of local optical pulses having a sufficiently narrow time duration, thereby enabling them to overlap with a single one of the optical pulse 110 of interest. In some embodiments, the bandwidth of the optical modulator 104 is at least 10 GHZ, preferably at least 15 GHZ and most preferably at least 20 GHz.

In some embodiments, such as the one illustrated in FIG. 1, the computer 108 is configured for communicating waveform instructions to the arbitrary wave generator 116. In other words, the arbitrary wave generator 116 can be programmed with the computer 108 and the electrical waveforms are updated at runtime during an experiment. In these embodiments, upon receiving the waveform instructions, the arbitrary wave generator 116 is configured for generating corresponding electrical waveforms and modulating one or more components of the optical modulator 114 with them. This modulation is performed in a way which forms the train of local optical pulses out of the local optical signal. In some embodiments, the arbitrary wave generator 116 can have its own, dedicated computer which may or may not be communicatively coupled to the computer 108. In some embodiments, the computer 108 includes at least partially or wholly the dedicated computer of the arbitrary wave generator 116. The computer 108 can control operation of the quantum light source 102 and the local pulse train generator 104.

As depicted, the homodyne detector 106 is optically coupled to the quantum light source 102 and to the local pulse train generator 104. More specifically, the homodyne detector 106 is configured for performing two-time correlation measurements between the given optical pulse 110 and the train of local optical pulses 118. For homodyne measurements to be made, the optical pulse 110 and the train of local optical pulses 110 reach the homodyne detector 106 at a same time. In some embodiments, the computer 108 can synchronize the generation of the optical pulse 110 and the formation of the train of local optical pulses 118 to one another such that the optical pulse 110 and the train of local optical pulses 118 simultaneously reach the homodyne detector 106. Such two-time correlation measurements are indicative of the modal property of the quantum state of the given optical pulse.

Due to the quantum nature of these measurements, only one two-time correlation measurement using one local optical pulse configuration may not be sufficient to fully characterize the modal property(ies) of the optical pulse's quantum state. To do so, a significant number of two-time correlation measurements are preferably made for each one of a plurality of local optical pulse configurations, as discussed further below. Indeed, by performing a statistically relevant number of two-time correlation measurements using a same local optical pulse configuration, and then other measurement rounds with different local optical pulse configurations, a correlation matrix can be obtained. Such a correlation matrix, and more specifically its eigenvalues and/or eigenmodes, can be informative on the modal property(ies) of the quantum state carried by the optical pulse of interest thereby allowing its quantum state reconstruction. A correlation matrix A can be expressed in the following manner:

$$\begin{bmatrix} A_{11} & \cdots & A_{1n} \\ \vdots & \ddots & \vdots \\ A_{m1} & \cdots & A_{mn} \end{bmatrix}, \quad (1)$$

with m and n denoting integers corresponding to mode numbers of first and second local optical pulses of a same train, and $A_{mn}$ denoting correlation matrix elements associated with the mode number combination m and n. Each of the correlation matrix elements can be given by equations equivalent to the following equations:

$$A_{mn} = \text{Re}\{A_{mn}\} + \text{Im}(A_{mn}), \text{ where} \quad (2)$$

$$\text{Re}\{A_{mn}\} = \frac{\text{Var}(X_m + X_n) - \text{Var}(X_m - X_n)}{4}, \quad (3)$$

$$\text{Im}(A_{mn}) = \frac{\text{Var}(X_m + iX_n) - \text{Var}(X_m - iX_n)}{4}, \text{ with } i \text{ the imaginary unit.} \quad (4)$$

To understand the nomenclature used in equations (3) and (4), it is convenient to define that for a two-time correlation measurement involving a train consisting of a first local optical pulse having the temporal shape $x_m(t)$ and a second local optical pulse having the temporal shape $x_n(t)$, the result of the two-time correlation measurement is referred to as $X_m + X_n$. When a significant number of such measurements are made, its statistical variance can be calculated, such as shown with the operator Var( . . . ), i.e., $\text{Var}(X_m + X_n)$. Accordingly, it is preferable to perform a significant number of two-time correlation measurements on identical optical pulses 110 of interest, e.g., at least 50,000, preferably at least 100,000 and most preferably at least 250,000, using a specific local optical pulse configuration. Increasing the number of two-time correlation measurements can help reducing the statistical noise on the calculated variances. It is also worth noting that in embodiments where the second local optical pulse is phase shifted by 0°, its temporal shape can be denoted by the function $+x_n(t)$; in embodiments where the second local optical pulse is phase shifted by 180°, its temporal shape can be denoted by the function $-x_n(t)$; in embodiments where the second local optical pulse is phase shifted by 90°, its temporal shape can be denoted by the function $+ix_n(t)$; and where the second local optical pulse is phase shifted by 270°, its temporal shape can be denoted by the function $-ix_n(t)$.

Accordingly, when the train includes a first local optical pulse of mode number m and a second local optical pulse of mode number n, both with no phase shift, the resulting temporal shape of the train may be represented by the function $x_m(t)+x_n(t)$. A two-time correlation measurement made by mixing such a train to the optical pulse 110 of interest is denoted $X_m+X_n$. Correspondingly, when the train includes a first local optical pulse of mode number m and a second local optical pulse of mode number n, with the second local optical pulse being phase shifted by 180°, the resulting temporal shape of the train may be represented by the function $x_m(t)-x_n(t)$, with the corresponding two-time correlation measurement being denoted $X_m-X_n$. If the train includes a first local optical pulse of mode number m and a second local optical pulse of mode number n, with the second local optical pulse being phase shifted by 90°, the resulting temporal shape of the train may be represented by the function $x_m(t)+ix_n(t)$, with the corresponding two-time correlation measurement being denoted $X_m+iX_n$. If the train includes a first local optical pulse of mode number m and a second local optical pulse of mode number n, with the second local optical pulse being phase shifted by 270°, the resulting temporal shape of the train may be represented by the function $x_m(t)-ix_n(t)$, with the corresponding two-time correlation measurement being denoted $X_m-iX_n$.

As equations (3) and (4) each involve two-time correlation measurements using two different local optical pulse configurations, determining each correlation matrix element $A_{mn}$ can involve two-time correlation measurements using four different local optical pulse configurations. Table 1 reproduced below shows exemplary parameters allowing the determining of correlation matrix element $A_{12}$, assuming that both the first and second local optical pulses are in the Hermite-Gaussian mode basis.

TABLE 1

Table showing local optical pulse configurations (LOPC) for the determination of correlation matrix element $A_{12}$

|  | LOPC #1 | LOPC #2 | LOPC #3 | LOPC #4 |
|---|---|---|---|---|
| First local pulse mode no. | 1 | 1 | 1 | 1 |
| First local pulse phase | 0° | 0° | 0° | 0° |
| Second local pulse mode no. | 2 | 2 | 2 | 2 |
| Second local pulse phase | 0° | 180° | 90° | 270° |
| First electrical waveform to modulate the local optical signal into the first local pulse | $EW_{HG, 1, 0°}(t)$ | $EW_{HG, 1, 0°}(t)$ | $EW_{HG, 1, 0°}(t)$ | $EW_{HG, 1, 0°}(t)$ |
| Second electrical waveform to modulate the local optical signal into the second local pulse | $EW_{HG, 2, 0°}(t)$ | $EW_{HG, 2, 180°}(t)$ | $EW_{HG, 2, 90°}(t)$ | $EW_{HG, 2, 270°}(t)$ |
| First pulse temporal shape | $x_1(t)$ | $x_1(t)$ | $x_1(t)$ | $x_1(t)$ |
| Second pulse temporal shape | $x_2(t)$ | $x_2(t)$ | $x_2(t)$ | $x_2(t)$ |
| Two-time correlation measurements | $X_1 + X_2$ | $X_1 - X_2$ | $X_1 + iX_2$ | $X_1 - iX_2$ |

Two-time correlation measurements can be made using the above parameters for different time delays between the first and second local optical pulses. It is noted that instructions for electrical waveforms such as the first and second electrical waveforms, or any other representation thereof, and/or for the different optical pulse configurations are typically compiled and stored on a memory of the computer 108 for easy access thereof. In embodiments where the optical modulator is an IQ modulator, each of the EW(t) waveforms identified above can include a first, in-phase electrical waveform (I) and a second, quadrature electrical waveform (Q). In some other embodiments, the electrical waveform instructions can be stored on a memory of the dedicated computer of the arbitrary wave generator.

The computer 108 can be provided as a combination of hardware and software components. The hardware components can be implemented in the form of a computing device 200, an example of which is described with reference to FIG. 2. Moreover, the software components of the computer 108 can be implemented in the form of a software application performing some or more steps of a method of determining a modal property of an optical pulse's quantum state, of a method of determining a correlation matrix using two-time correlation measurements.

Figure 2:
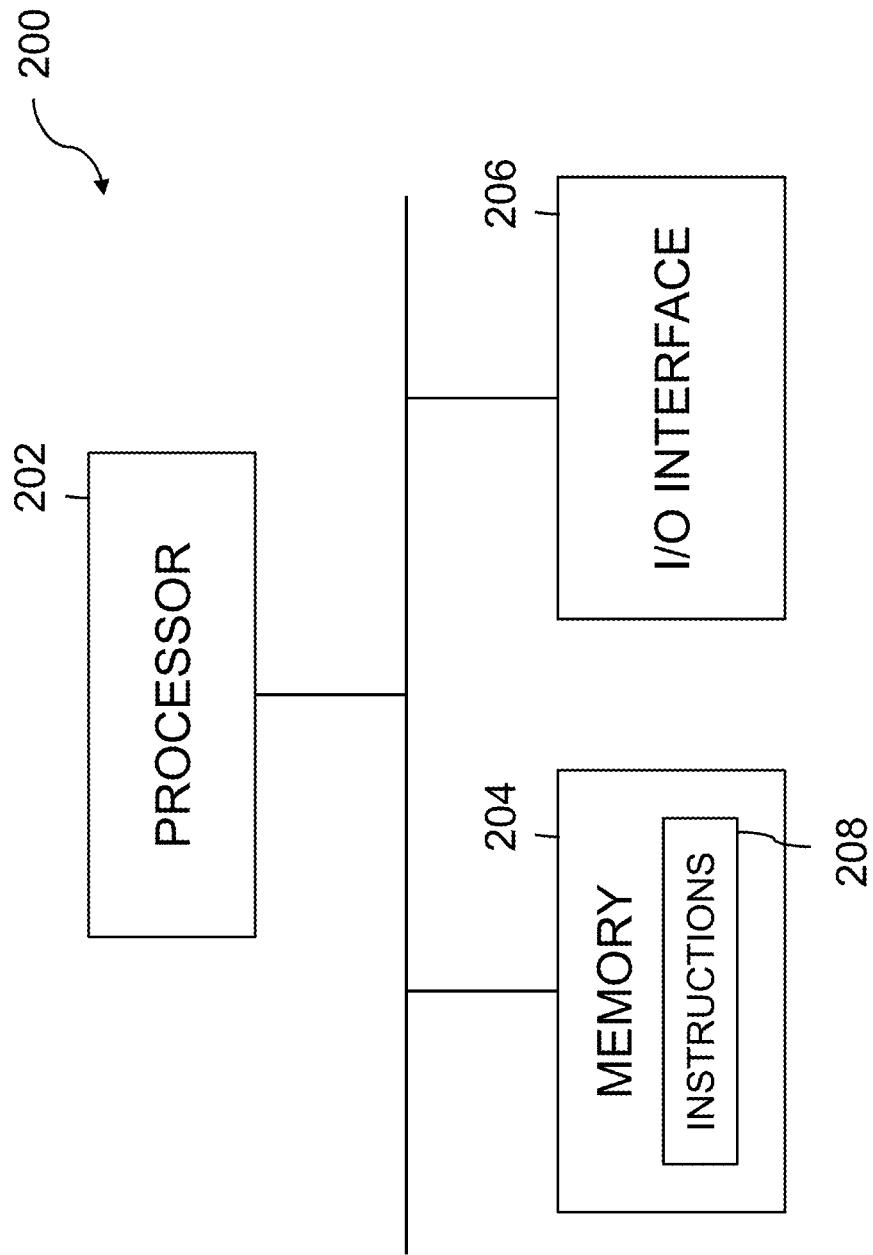
FIG. 2 is a schematic view of an example of a computing device of the computer of FIG. 1, in accordance with one or more embodiments.

Referring to FIG. 2, the computing device 200 can have a processor 202, a memory 204, and I/O interface 206. Instructions 208 for performing the method of determining a modal property of an optical pulse's quantum state and/or of the method of determining a correlation matrix using two-time correlation measurements can be stored on the memory 204 and accessible by the processor 202.

The processor 202 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 204 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 206 enables the computing device 200 to interconnect with one or more input devices, such as a mouse, a keyboard, a user interface, a homodyne detector and/or its acquisition unit, or with one or more output devices such as display, an accessible server or network, the arbitrary wave generator and the like.

Each I/O interface 206 enables the computer 108 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WIMAX), SS7 signaling network, fixed line, local area network, wide area network, and others, including any combination of these.

The computer 108 can run one or more software applications configured to operate the quantum light source, the arbitrary wave generator and/or the homodyne detector. In some embodiments, software applications are stored on the memory 204 and accessible by the processor 202 of the computing device 200. The computing device 200 and the software applications described above are meant to be examples only. Other suitable embodiments of the computer 108 can also be provided, as it will be apparent to the skilled reader. The computer 108 can be a standalone computer in communication with a computer of the homodyne detector and/or a computer of the arbitrary wave generator in some embodiments. In some other embodiments, the computer 108 is decentralized and has portions associated with the homodyne detector and/or with the arbitrary wave generator.

Figure 3:
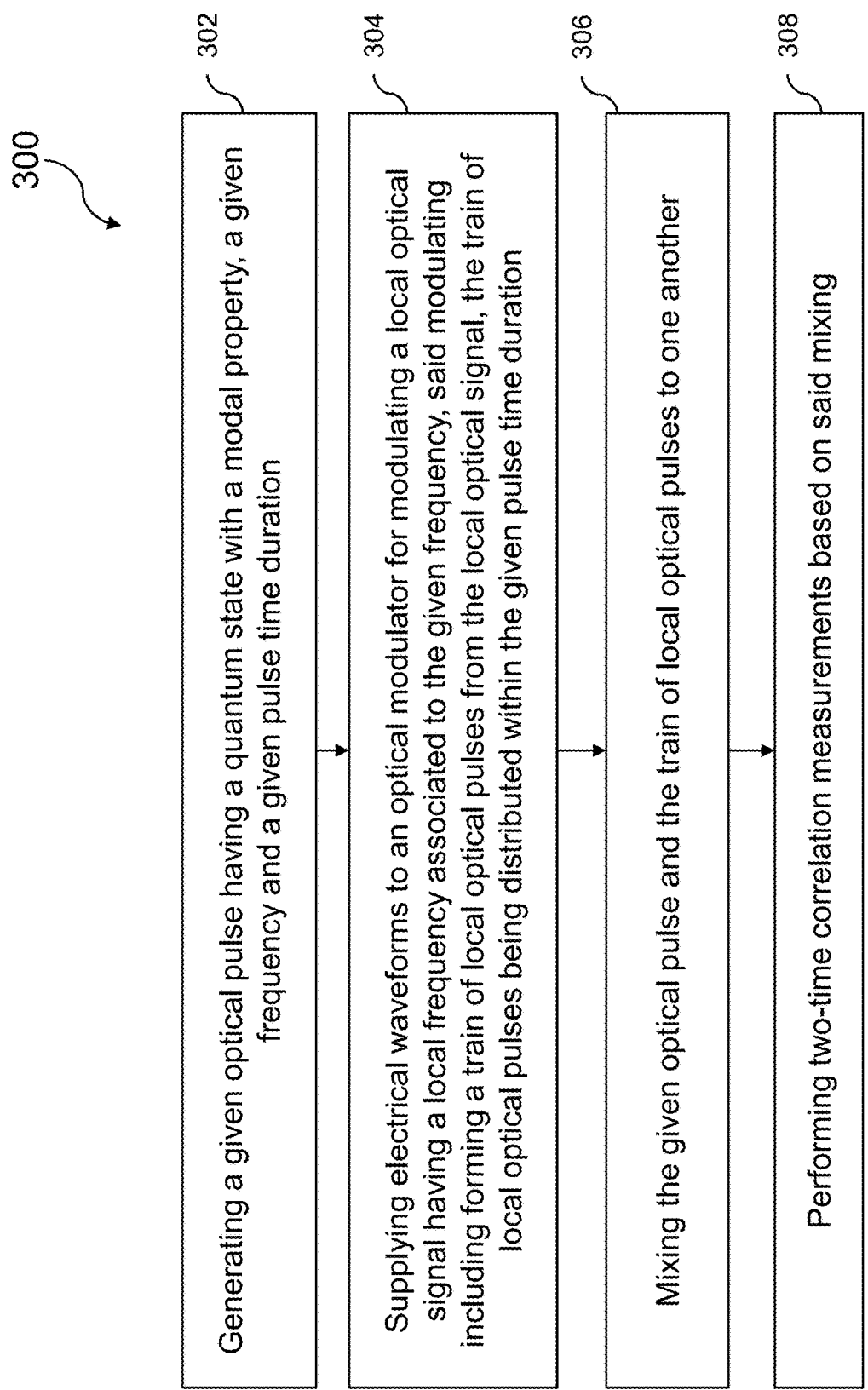
FIG. 3 is a flow chart of an example of a method of determining a modal property of a quantum state using two-time correlation measurements, in accordance with one or more embodiments.

FIG. 3 shows a flow chart of an example of a method 300 of determining a modal property of a quantum state using two-time correlation measurements. The method 300 can be performed using the system 100. For ease of reading, the method 300 is described using the reference numerals used in the description of the system 100 of FIG. 1.

At step 302, a given optical pulse 110 is generated. The given optical pulse 110 generally has a quantum state with one or more modal properties, a given frequency and a given pulse time duration.

At step 304, using the arbitrary wave generator 116, electrical waveforms are supplied to an optical modulator 114 for modulating a local optical signal having a local frequency associated to the given frequency. The electrical waveforms can be generated in accordance with waveform instructions received from the computer 108, for instance. It is understood that the waveform instructions, when executed by the arbitrary wave generator 116, can form a train of local optical pulses 118 having a specific local optical pulse configuration. For instance, the waveform instructions may include information concerning the number of local optical pulses that are expected to overlap with the optical pulse 110 of interest (e.g., two, three), their time delays relative to the optical pulse of interest, their respective mode basis (e.g., Hermite-Gaussian mode basis, time-shifted Dirac mode basis), their respective mode numbers (e.g., 1, 2, 3) and phase delay (e.g., 0°, 90°, 180°, 270°), if any. The local frequency of the local optical signal can correspond, and even be substantially similar, to the given frequency of the optical pulse of interest. The local frequency can be locked to the given frequency of the optical pulse of interest in some embodiments. The train of local optical pulses is distributed within the given pulse time duration, meaning that the local optical pulses overlap at least partially with the optical pulse of interest.

In some embodiments, the method 300 may include a step of storing waveform instructions associating desired local optical pulse configurations to corresponding electrical waveforms. The method 300 can also include a step of associating the waveform instructions and/or the local optical pulse configuration to the corresponding two-time correlation measurements. Although these latter steps can be optional, they can be preferred in some instances as they can ease the formation of the correlation matrix down the road.

In some embodiments, the electrical waveforms are selected based on a priori knowledge (e.g., from simulations or previous measurements) of at least one temporal shape of the quantum state of the given optical pulse. Indeed, in these embodiments, if it is known that the optical pulse 110 of interest is shaped in a similar fashion with a given mode basis, shaping the local optical pulses in that same mode basis may help reduce the amount of different local optical pulse configurations required to fully determine the modal property of the optical pulse's quantum state. These temporal shapes of a given quantum state can be expressed in terms of different mode bases including, but not limited to, the time-shifted Dirac mode basis, the Hermite-Gaussian mode basis and the like. In some embodiments, the temporal shape(s) of a given quantum state can be expressed more elegantly in one specific mode basis than another. For instance, a quantum state's temporal shape may be expressed using only a few modes in a given mode basis whereas the same given temporal shape may be expressed using a significant number of modes in another mode basis. In these embodiments, it can thereby be advantageous to select the mode basis of the local optical pulses that most resemble the expected temporal shape of the quantum state of the optical pulse 110 of interest.

At step 306, using the homodyne detector 106, the given optical pulse and the train of local optical pulses are mixed with one another. Such mixing can be performed using an optical coupler that is part of the homodyne detector 106. Examples of such an optical coupler can include, but are not limited to, a free space or fiber 50:50 beam splitter, a 2×2 free space or fiber coupler, and the like.

At step 308, the homodyne detector 106 performs one or more two-time correlation measurements based on the mixing of step 306. With each of these measurements producing a corresponding value, a significant number of values can be measured. These measured values are not as important as the statistical variation that they carry. Accordingly, the method 300 may include a step of calculating a statistical variance based on the measured values. The statistical variance associated with a given configuration of local optical pulses can be stored on an accessible memory or communicated to a remote network.

In some embodiments, the method 300 includes a step of repeating the step 308 for different local optical pulse configurations such as those described above. In these embodiments, the method 300 can include a step of determining a correlation matrix based on the two-time correlation measurements made with the different local optical pulse configurations and a step of determining the modal property of the quantum state based on a decomposition of eigenvalues and/or eigenmodes of the correlation matrix. The determined modal property(ies) of the quantum state of interest can be stored on an accessible memory and/or transmitted to an external network.

Figure 4:
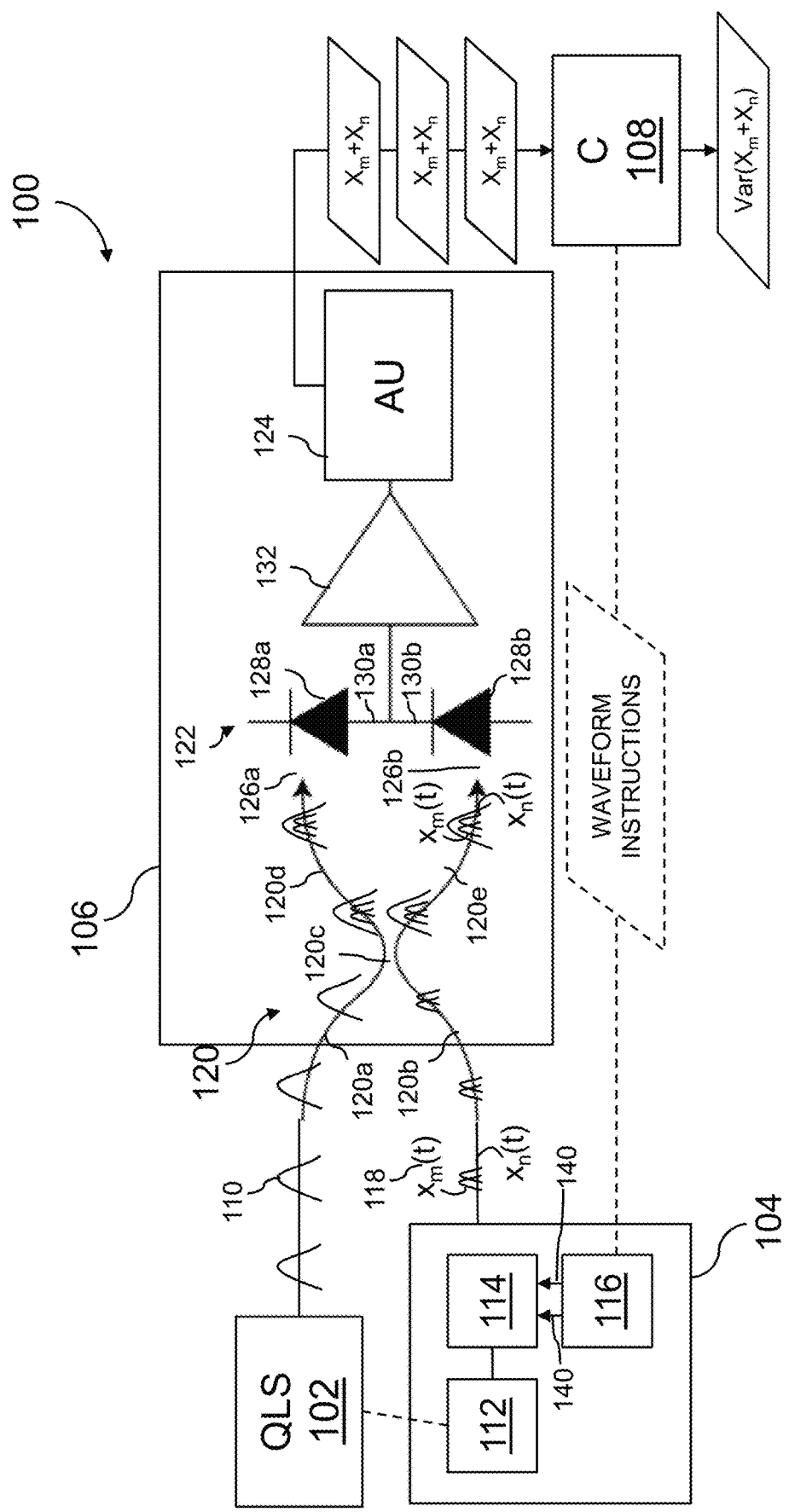
FIG. 4 is a schematic view of an example of the system of FIG. 1, in accordance with one or more embodiments.

FIG. 4 shows a schematic view of the system 100. In some embodiments, the quantum light source 102 has an optical resonator, a nonlinear optical material within the optical resonator and a pulsed pump laser pumping the nonlinear optical material. The quantum light source 102 can thus include a nonlinear optical material such as a material having a second order or a third order nonlinearity. In these embodiments, the nonlinear optical material is placed within an optical resonator, and the optical resonator is pumped using one, two or more pulsed pump lasers. In some specific embodiments, the optical resonator is provided in the form of a silicon nitride microring resonator made of a material with a third order nonlinearity. The silicon nitride microring resonator can be pumped with a single pulsed pump laser having a ~1550 nm wavelength. The pump laser pulses can have pulse durations of about one nanosecond or shorter which can generate a two-mode squeezed vacuum state at two different frequencies or wavelengths. Alternatively, two pulsed pump lasers of frequencies spaced by an even number of ring resonator free spectral range can generate a single squeezed vacuum state at a frequency which is an average of the frequencies of two pulsed pump lasers. The light can be amplified, for example with an erbium-doped fiber amplifier before being sent into the microring resonator. It is noted that these examples of quantum light sources are meant to be exemplary only, as other constructions of quantum light sources can be used in some other embodiments. For instance, the quantum light source can be provided in the form of an optical parametric oscillator.

As shown in this example, the optical modulator is provided in the form of an IQ modulator being electrically connected to the optical modulator 114 via two separate and independent electrical conductors 140. In this embodiment, each one of these electrical conductors 140 carries a respective electrical waveform generated by the arbitrary wave generator 116. One of these electrical waveforms can be referred to as an in-phase electrical waveform I modulating a first component of the local optical signal and the other one of the electrical waveforms can be referred to as a quadrature electrical waveform Q modulating a second component of the local optical signal. The first and second components of the local optical signal have a relative phase difference of 90°. It is noted that both the in-phase and quadrature waveforms may be required to form one of the local optical pulses of the train. Accordingly, to create a train of such local optical pulses, the arbitrary wave generator 116 typically generates electrical waveforms I and Q at fast pace in accordance with some waveform instructions received from the computer 108. Examples of such optical modulators can include, but are not limited to, the 20 GHz lithium niobate optical modulator, the MXIQER-LN-30 optical IQ modulator, the Thorlabs LN86S optical IQ modulator, to name a few examples. In situations where an IQ modulator is used, it is preferable to appropriately calibrate the IQ modulator prior to performing the two-time correlation measurements. In some experiments, it may be preferable also to recalibrate the IQ modulator during the experiment. The IQ modulator is preferably calibrated for linearity and frequency response at all times.

Although the construction of the homodyne detector 106 can vary from one embodiment to another, the homodyne detector 106 generally has an optical coupler 120, a detection assembly 122 and an acquisition unit 124. As shown, the optical coupler 120 mixes the given optical pulse 110 and the train of local optical pulses 118 to one another and outputs two interference signals 126a and 126b. For instance, the optical coupler 120 can be provided in the form of a 2×2 optical coupler having a first input arm 120a receiving the optical pulse 110 from the quantum light source 102 and a second input arm 120b receiving the train of local optical pulses 118, a coupling region 120c where the first and second input arms 120a and 120b couple to one another, and two output arms 120d and 120e along which a mix of the optical pulse 110 and of the train of local optical pulses 118 propagate. In this example, the detection assembly 122 has a pair of photodetectors 128a and 128b electrically connected in series to one another. The photodetectors 128a and 128b can be photodiodes (e.g., slow photodiodes) in some embodiments. Examples of such photodetectors can include, but are not limited to, the Laser Components HQE detector, the Thorlabs FGA01FC InGaAs photodiode, and the like. As shown, each of the photodetectors 128a and 128b receives a corresponding one of the two interference signals 126a and 126b and produces a corresponding photocurrent signal 130a, 130b. The detection assembly 122 also has an amplifier 132, such as a transimpedance amplifier, which amplifies a difference between the photocurrent signals 130a and 130b generated by the photodetectors 128a and 128b. In some embodiments, the amplifier 132 is provided in the form of a transimpedance amplifier using a low-noise op-amp such as the Digikey OPA818 or OPA847 amplifiers. It is noted that the electronic noise of the transimpedance amplifier is preferably significantly smaller than the amount of shot noise produced by the local optical pulse generator 104. In this embodiment, the homodyne detector 106 is arranged in a slow balanced homodyne detector involving slow photodiodes. In these embodiments, the response times of the photodiodes are slower than the length of the temporal mode of the quantum state of interest, which can reduce noise compared to situations where fast diode are used. Moreover, it was found that when using fast diodes, and especially in situations that the temporal mode of a quantum state of interest is a complex function, several measurements would need to be taken at different frequencies of the local pulse train generator to distinguish the real and imaginary part of the correlation matrix, which was found to be inconvenient.

As shown, the acquisition unit 124 samples or otherwise digitizes the amplified difference and produces measured values that can be sent to the computer 108. In some embodiments, each digitized pulse received from the amplifier is integrated to produce a corresponding measured value. The acquisition unit 130 can include an analog-to-digital converter and a dedicated computer (e.g., FPGA) for further processing. The acquisition unit 130 is preferably synchronized to the arbitrary wave generator 116. As shown, a series of optical pulses 110 of interest are mixed with a series of similar trains of local optical pulses 118. As discussed above, the temporal shape of the first and second local optical pulses can be represented by the functions $x_m(t)$ and $x_n(t)$, respectively, with m and n denoting integers corresponding to the mode numbers of the first and second local optical pulses. As depicted, each two-time correlation measurement can be represented by $X_m + X_n$. As such, the computer 108 can store each one of these measurements and then proceed with the calculation of a variance of the two-time correlation measurements, denoted $\text{Var}(X_m + X_n)$.

Figure 5:
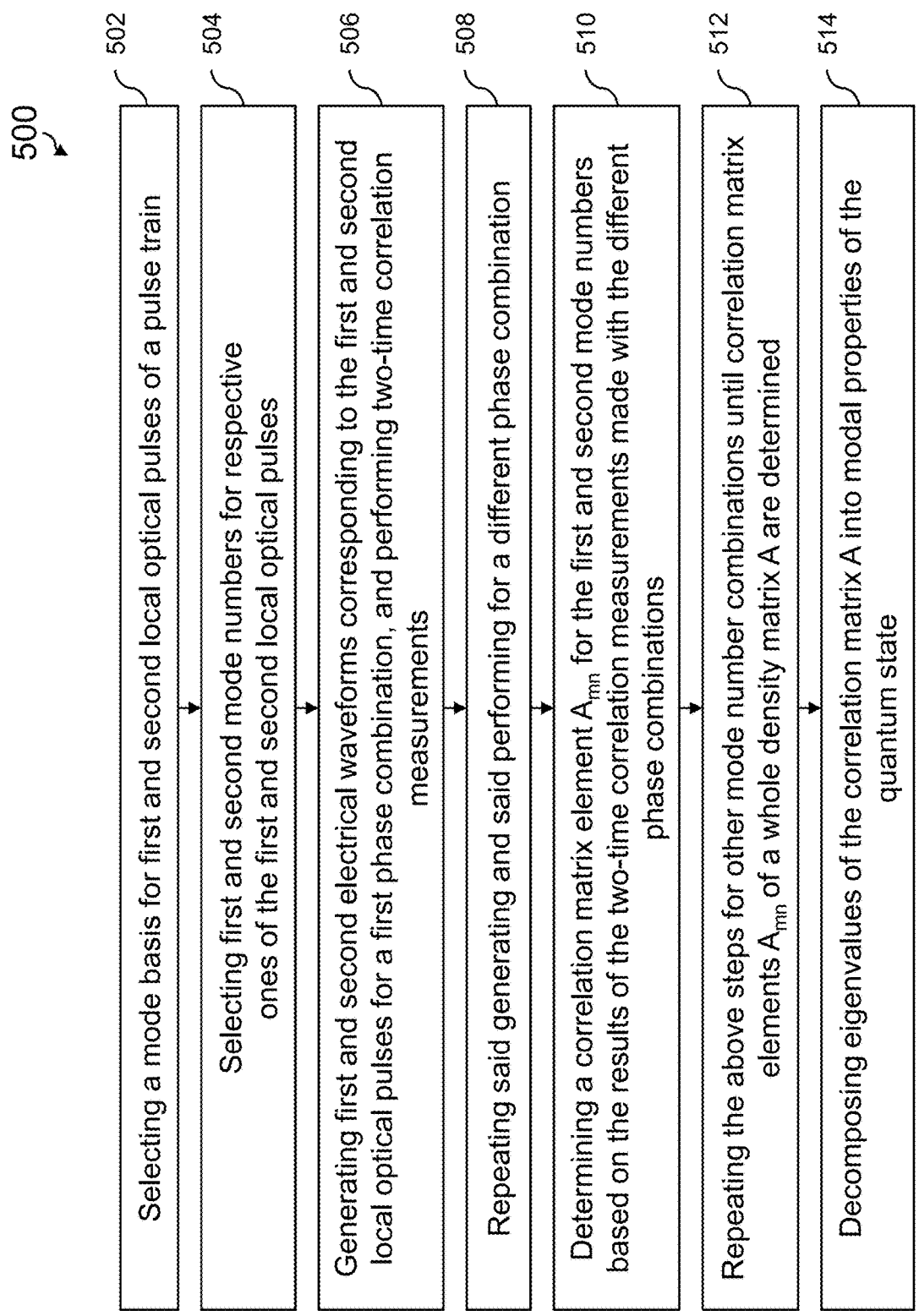
FIG. 5 is a flow chart of a method of performing two-time correlation measurements using the system of FIG. 4, resulting in a correlation matrix A having correlation matrix elements $A_{mn}$, in accordance with one or more embodiments.

FIG. 5 shows a flow chart of a method 500 of determining a correlation matrix using the system 100. The method 500 is described with a train of local optical pulses comprising only two local optical pulses, namely the first and second local optical pulses. However, it is understood that in some other embodiments the train of local optical pulses can have more than two local optical pulses.

At step 502, a mode basis for the first and second local optical pulses is selected. The mode basis for the first and second local optical pulses can be one of a group consisting of: Hermite-Gaussian orthogonal modes, Laguerre-Gaussian orthogonal modes, time-shifted Dirac impulse-type modes and a mode basis determined by a numerical simulation of the quantum light source generating the optical pulse of interest. Typically, the mode basis for the first and second local optical pulses is the same mode basis to ensure that the modes of the first and second local optical pulses are orthogonal to one another. This selection can be made through a selection or programming tool of a computer. This selection can remain unchanged throughout the determining of a given correlation matrix. Accordingly, it may be selected only once for all the two-time correlation measurements associated with a single correlation matrix.

At step 504, first and second mode numbers m and n are selected for a respective one of the first and second local optical pulses. For instance, the first mode number can be m with m being an integer ranging from 1 to M, where M is a higher-order mode number of the given mode basis. The second mode number can be n with n being an integer ranging from 1 to N, where N is a higher-order mode number of the given mode basis. In some local optical pulse configurations, the first and second mode numbers can be equal to one another. In some other local optical pulse configurations, the first and second mode numbers are different from one another.

At step 506, first and second electrical waveforms corresponding to the first and second local optical pulses are generated for a first phase combination. If reference is made to Table 1 above, the first phase combination can be 0° and 0° for the first and second local optical pulses, respectively. With that first phase combination, two-time correlation measurements are performed, leading to a significant number of two-time correlation measurements $X_m + X_n$. In some embodiments, two-time correlation measurements are performed using the same parameters for the first and second local optical pulses, except that they are time delayed with respect from one another, and two-time correlations measurements are made for different such time delays.

At step 508, the steps 506 are repeated a number of times for different phase combinations. For instance, if the first phase combination was 0° and 0°, then a second phase combination may be 0° and 180° for the first and second local optical pulses, respectively. This step can thus lead to a significant number of two-time correlation measurements $X_m$–$X_n$. In accordance with equations (3) and (4) discussed above, the step 508 may be repeated twice again for a third phase combination and a fourth phase combination. For instance, the third phase combination can be of 0° and 90° for the first and second local optical pulses, respectively. These measurements can result in two-time correlation measurements $X_m$+$iX_n$. Similarly, the fourth phase combination of 0° and 270° for the first and second local optical pulses, respectively, leading to a significant number of two-time correlation measurements $X_m$–$iX_n$.

At step 510, a correlation matrix element $A_{mn}$ is determined for the first and second mode numbers based on the results of the two-time correlation measurements made with the different phase combinations. For instance, the statistical variance can be calculated for the two-time correlation measurements $X_m$+$X_n$, $X_m$–$X_n$, $X_m$+$iX_n$ and $X_m$–$iX_n$, e.g., Var($X_m$+$X_n$), Var($X_m$–$X_n$), Var($X_m$+$iX_n$) and Var($X_m$–$iX_n$), respectively. Then, the real and imaginary parts of the correlation matrix element $A_{mn}$ can be calculated using the equations (3) and (4).

At step 512, the steps 504, 506, 508 and 510 are repeated for other mode number combinations until all the correlation matrix elements $A_{mn}$ of the correlation matrix A are determined.

In some embodiments, two-time correlation measurements are made without any optical pulse of interest. These measurements are known as vacuum measurements, and can be indicative of how the local optical pulses react into the vacuum. In these embodiments, a vacuum correlation matrix $A_0$ can be determined using the same process as the one described above. When such a vacuum correlation matrix $A_0$ is determined, a vacuum-compensated correlation matrix A' can be obtained by subtracting the vacuum correlation matrix $A_0$ from the correlation matrix A, e.g., A'=A–$A_0$.

At step 514, eigenvalues and/or eigenmodes of the correlation matrix A' are decomposed which result in at least one or more modal properties of the quantum state of the optical pulse of interest. For instance, if the eigenvalues of the correlation matrix A' include a given number of values above a certain threshold (e.g., noise floor), then it can be deemed that the optical pulse's quantum state has the given number of modes. More specifically, the number of modes is given by the number of nonzero eigenvalues above a certain threshold, and their relative photon number is given by the scale of the eigenvalue. Otherwise, eigenvalues below the certain threshold are considered to be caused by noise and can be ignored. Moreover, if the first and second local optical pulses are in the Hermite-Gaussian mode basis, and only the eigenvalues of correlation matrix elements $A_{11}$ and $A_{22}$ are greater than the certain threshold, then it may be deemed that the temporal shape of the quantum state includes the first and second mode of the Hermite-Gaussian mode basis.

Figure 6C:
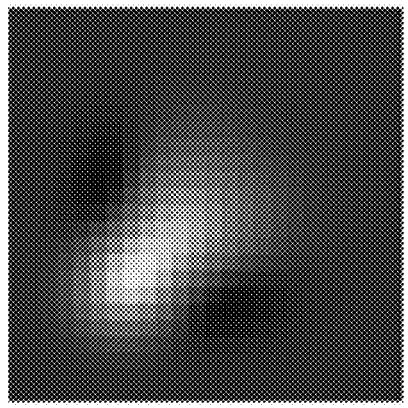
FIG. 6C is representation of an example of a correlation matrix obtained by performing two-time correlation measurements on a mix of the optical pulse of interest of FIG. 6A and local optical pulses shaped in the impulse mode basis, in accordance with one or more embodiments.
Figure 6E:
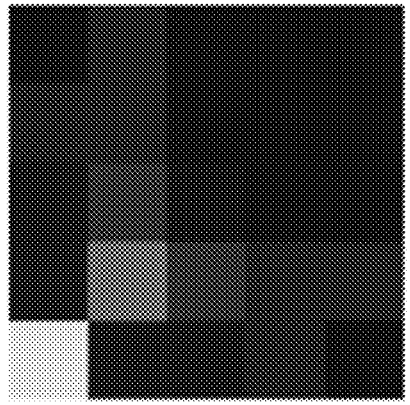
FIG. 6E is representation of an example of a correlation matrix obtained by performing two-time correlation measurements on a mix of the optical pulse of interest of FIG. 6A and local optical pulses shaped in the Hermite-Gaussian mode basis, in accordance with one or more embodiments.
Figure 6B:
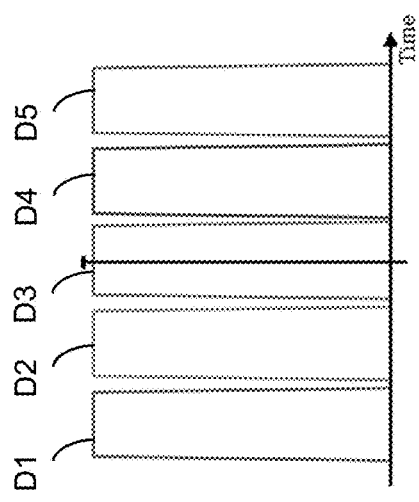
FIG. 6B is a graph showing local optical pulses having a pulse shape in the impulse basis, in accordance with one or more embodiments.
Figure 6D:
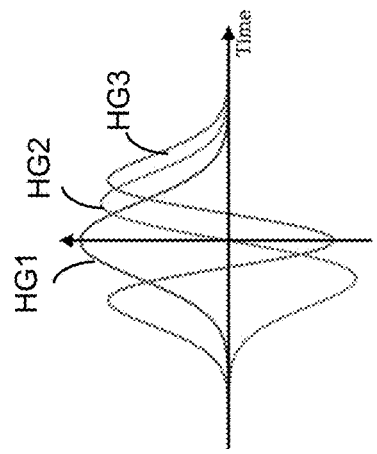
FIG. 6D is a graph showing local optical pulses having a pulse shape in the Hermite-Gaussian basis, in accordance with one or more embodiments.
Figure 6A:
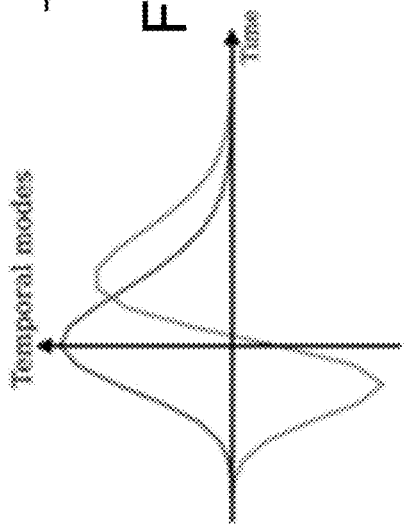
FIG. 6A is a graph showing temporal shapes of a quantum state of an optical pulse of interest, with the temporal shapes being similar to Hermite-Gaussian modes, in accordance with one or more embodiments.

The results of a simulation concerning this situation is shown in FIGS. 6A through 6E. More specifically, FIG. 6A shows the temporal shapes of the quantum state of an optical pulse of interest. As can be noticed, these two temporal shapes are similar to the first and second modes in the Hermite-Gaussian mode basis. FIG. 6B shows exemplary first and second local optical pulses in the time-shifted Dirac impulse mode basis used to run two-time correlation measurements. It is noted that each of the modes D1 to D5 are orthogonal from one another. As shown in FIG. 6C, a correlation matrix obtained from such measurements shows that the two temporal shapes of the quantum state of interest can be expressed in terms of 8-10 time-shifted Dirac impulse modes. However, if the same experiment is made using first and second modes in the Hermite-Gaussian mode basis, then the resulting correlation matrix can converge more efficiently, and require a lesser number of local optical pulse configurations. FIG. 6D shows exemplary first and second local optical pulses in the Hermite-Gaussian mode basis used to run two-time correlation measurements. Similarly, the modes HG1 to HG3 are orthogonal from one another. FIG. 6E shows the resulting correlation matrix. As depicted, the first and second modes of the Hermite-Gaussian mode basis are sufficient to express the temporal shapes of the quantum state of interest. In this manner, the correlation matrix obtained in the Hermite-Gaussian mode basis is sparser and more compact. This can result in faster measurements using that mode basis.

In cases where the temporal shape(s) of a quantum state of interest are unknown, more two-time correlation measurements are necessary to converge. However, in cases where the temporal shape(s) are only partially known, better choice of shapes at the two-time correlation measurements level can be made so as to converge more quickly. As such, the local optical pulses can be shaped arbitrarily in a mode basis that resembles the quantum state's temporal shape, greatly reducing the number of elements of the correlation matrix required to accurately characterize the quantum state with good purity (e.g., purity larger than 0.9). Accordingly, it is intended that, in situations where a little information concerning the quantum state of interest is known, the known information be used to inform and orient the way the two-time correlation measurements are made. In view of this simulation, it is noted that the Dirac impulse basis may be preferred in situations where little to no information is known concerning the temporal shapes of the quantum state of interest. In these situations, determining the correlation matrix may be longer, as it requires an increased amount of local optical pulse configurations. In these situations, one can measure the given pulse time duration of the optical pulse of interest, and set the spacing and number of time-shifted Dirac impulse modes to be used in the two-time correlation measurements. As such, shorter optical pulses of interest may necessitate a lesser amount of different local optical pulse configurations than longer optical pulses of interest. In the Dirac impulse basis, the lengths of the first and second optical pulses are preferably smaller than a temporal resolution of the temporal shape of the quantum state of interest, and the time spans of the first and second optical pulses preferably cover the entire temporal shape of the quantum state of interest. For instance, in a production line along which quantum light sources such as light squeezers are produced, it may be expected that the quantum light sources generate optical pulses carrying a quantum state having one or more temporal shapes in a given mode basis. These expectations can stem from previous measurements or from simulations. Then, characterization of the quantum light sources, e.g., for quality purposes, can involve a train of local optical pulses expressed in that same given mode basis. In this way, characterizing each quantum light source produced along the production line can require less time as instead of using tens or hundreds of mode combinations, then the characterization may involve only a few. Knowledge relative to temporal shape of the quantum state of interest can reduce by about ten times the number of two-time correlation measurements to be made, in some circumstances.

In another aspect, it was found convenient to perform the above methods using the above system to determine at least a temporal mode of the quantum state of an optical pulse of interest. In these embodiments, these two-time correlation measurements can be part of a first measurement phase. The temporal shape in question can be determined by decomposing an eigenvalue above a given threshold in the correlation matrix. Once the first measurement phase is done, another round of measurements, referred to here as a set of homodyne tomography measurements, can be made later. More specifically, in the second measurement phase, the local optical pulses are selected based on knowledge of the temporal mode of the quantum state determined in the first measurement phase. In other words, the temporal shapes resulting from the eigenvalue decomposition can be inputted in the arbitrary wave generator for the second round of measurements. Moreover, the local optical pulses are phase-locked to the optical pulse of interest. In these embodiments, the resulting set of homodyne detector measurements corresponds to quadrature samples of the quantum state in the given temporal shape at the given phase. By repeating the homodyne tomography measurements with a large enough number of phases, other complementary modal properties of the quantum state can be reconstructed using tomography techniques. As such, the set of homodyne tomography measurements can be further indicative of another modal property of the temporal mode. In some instances, the amount of squeezing carried by the temporal shape can be determined thanks to the second measurement phase.

As can be understood, the examples described above and illustrated are intended to be exemplary only. For instance, although the equations and examples presented above require four sets of two-time correlation measurements, one for each of the four phase combinations (e.g., 0° and 0°, 0° and 180°, 0° and 90°, and 0° and 270°), it is noted that in some other embodiments any correlation matrix element $A_{mn}$ can be determined using more than these four phase combinations, or different phase combinations, if equations other than equations (3) and (4) are used. Although equations (3) and (4) were found convenient in avoiding cross-correlation terms, they are meant to be exemplary only. Any phase combinations can be used, depending on the embodiment. Some other equations for the correlation matrix elements $A_{mn}$ can be used. However, they may not provide both the real and imaginary parts of the correlation matrix elements $A_{mn}$. Indeed, some phase combinations may only result in determining the real part of the correlation matrix elements $A_{mn}$. Removing the cross-correlation terms can also be performed by using diagonal elements of the correlation matrix A only, but the two-time correlation measurements may have poor signal-to-noise ratio and no imaginary parts, for instance. The scope is indicated by the appended claims.

What is claimed is:

1. A system for determining a modal property of a quantum state using two-time correlation measurements, the system comprising:
    a quantum light source generating a given optical pulse having a given frequency, a given pulse time duration and a quantum state, the quantum state having the modal property;
    a local pulse train generator having: a laser source generating a local optical signal having a local frequency associated to the given frequency; an optical modulator optically coupled to the laser source and modulating the local optical signal; and a programmable wave generator electrically coupled to the optical modulator and supplying electrical waveforms to the optical modulator for said modulating, the electrical waveforms supplied to the optical modulator corresponding to one or more mode bases, said modulating including:
        forming a train of local optical pulses from the local optical signal, the train of local optical pulses being distributed within the given pulse time duration; and
        shaping each local optical pulse in the train of local optical pulses into a temporal shape corresponding to the one or more mode basis via the electrical waveforms suppled to the optical modulator by the programmable wave generator; and
    a homodyne detector optically coupled to the quantum light source and to the local pulse train generator, the homodyne detector performing two-time correlation measurements between the given optical pulse and the train of local optical pulses, the two-time correlation measurements being indicative of the modal property of the quantum state of the given optical pulse.

2. The system of claim 1 wherein the optical modulator is an IQ modulator, the electrical waveforms including an in-phase electrical waveform modulating a first component of the local optical signal and a quadrature electrical waveform modulating a second component of the local optical signal, the first and second components of the local optical signal having a relative phase difference of 90°.

3. The system of claim 1 wherein the optical modulator has a bandwidth greater than the inverse of a pulse time duration of a shorter one of the electrical waveforms.

4. The system of claim 1 wherein the local frequency of the local optical signal is locked to the given frequency of the given optical pulse.

5. The system of claim 1 wherein the homodyne detector has an optical coupler mixing the given optical pulse and the train of local optical pulses to one another and outputting two interference signals, a pair of photodetectors electrically connected in series to one another, each photodetector receiving a corresponding one of the two interference signals and producing a corresponding photocurrent signal, and an amplifier amplifying a difference between the photocurrent signals generated by the photodetectors.

6. The system of claim 1 further comprising a computer controlling operation of the quantum light source and the local pulse train generator, the computer synchronizing said generating the given optical pulse and said forming the train of local optical pulses to one another, the given optical pulse and the train of local optical pulses simultaneously reaching the homodyne detector.

7. The system of claim 1 wherein the quantum light source has an optical resonator, a nonlinear optical material in the optical resonator and a pulsed pump laser pumping the nonlinear optical material, the laser source of the local pulse train generator being frequency locked to the pulsed pump laser.

8. The system of claim 1 wherein the one or more mode basis are selected based on one of:
    a priori knowledge of at least one temporal mode of the quantum state of the given optical pulse; and
    a time-shifted Dirac impulse-type mode in absence of the priori knowledge.

9. The system of claim 1 wherein the electrical waveforms are selected to form a train of local optical pulses including a first local optical pulse of a first mode and a second local optical pulse of a second mode orthogonal to the first mode.

10. The system of claim 9 wherein the one or more mode basis are selected from a group including at least one of Hermite-Gaussian orthogonal modes, Laguerre-Gaussian orthogonal modes and time-shifted Dirac impulse-type modes.

11. The system of claim 9 wherein the first mode has a phase set to 0° and the second mode has a phase set to one of 0°, 90°, 180 and 270°.

12. A method of determining a modal property of a quantum state using two-time correlation measurements, the method comprising:
   generating a given optical pulse having a quantum state, a given frequency and a given pulse time duration;
   using a programmable wave generator, supplying electrical waveforms to an optical modulator for modulating a local optical signal having a local frequency associated to the given frequency, the electrical waveforms supplied to the optical modulator corresponding to one or more mode basis, said modulating including:
      forming a train of local optical pulses from the local optical signal, the train of local optical pulses being distributed within the given pulse time duration; and
      shaping each local optical pulse in the train of local optical pulses into a temporal shape corresponding to the one or more mode basis via the electrical waveforms supplied to the optical modulator by the programmable wave generator; and
   using a homodyne detector, mixing the given optical pulse and the train of local optical pulses to one another and performing two-time correlation measurements based on said mixing, the two-time correlation measurements being indicative of the modal property of the quantum state of the given optical pulse.

13. The method of claim 12 wherein, in a first measurement phase, the two-time correlation measurements are indicative of a temporal mode of the quantum state of the given optical pulse.

14. The method of claim 13 wherein, in a second measurement phase, the method further comprises selecting the one or more mode basis based on the temporal mode of the quantum state and phase locking the train of optical pulses to the given optical pulse, the second measurement phase including performing a set of homodyne tomography measurements, the second set of homodyne tomography measurements being further indicative of a modal property of the temporal mode.

15. The method of claim 12 wherein the one or more mode basis are selected based on one of:
   a priori knowledge of at least one temporal mode of the quantum state of the given optical pulse; and
   a time-shifted Dirac impulse-type mode in absence of the priori knowledge.

16. The method of claim 12 wherein said supplying includes selecting the electrical waveforms to form a train of local optical pulses including a first local optical pulse of a first mode and a second local optical pulse of a second mode orthogonal to the first mode.

17. The method of claim 16 wherein the first mode has a phase set to 0° and the second mode has a phase set to one of 0°, 90°, 180° and 270°.

18. The method of claim 12 further comprising repeating said performing for a plurality of different local optical pulse configurations, determining a correlation matrix based on the two-time correlation measurements made with the plurality of different local optical pulse configurations and determining the modal property of the quantum state based on a decomposition of one of eigenvalues and eigenmodes of the correlation matrix.

19. The method of claim 12 further comprising synchronizing said generating the given optical pulse and said forming the train of local optical pulses to one another, the given optical pulse and the train of local optical pulses simultaneously reaching the homodyne detector.

20. The method of claim 12 wherein the one or more mode basis are selected from a group consisting of at least one of Hermite-Gaussian orthogonal modes, Laquerre-Gaussian orthogonal modes, and time-shifted Dirac impulse-type modes.

* * * * *